United States Patent [19]
Waffler et al.

[11] Patent Number: 5,726,647
[45] Date of Patent: Mar. 10, 1998

[54] METHOD AND APPARATUS FOR AVOIDING A COLLISION OF A MOTOR VEHICLE

[75] Inventors: Andreas Waffler, Neubiberg; Walter Weishaupt, München; Winfried Siegl, Beilngries; Kurt Schwaiger, Germering, all of Germany

[73] Assignee: Bayersche Motoren Werke Aktiengesellscaft, Germany

[21] Appl. No.: 628,249

[22] Filed: Apr. 5, 1996

[30] Foreign Application Priority Data

Apr. 5, 1995 [DE] Germany ............... 195 12 644.0

[51] Int. Cl.⁶ .................................................. G08G 1/16
[52] U.S. Cl. ..................... 340/903; 340/904; 340/435; 340/436; 180/169
[58] Field of Search ........................ 340/903, 435, 340/436, 904; 367/909; 180/169

[56] References Cited

U.S. PATENT DOCUMENTS

| | | | |
|---|---|---|---|
| 4,658,385 | 4/1987 | Tsuji | 367/105 |
| 5,249,157 | 9/1993 | Taylor | 340/903 |
| 5,266,955 | 11/1993 | Izumi et al. | 342/70 |
| 5,477,461 | 12/1995 | Waffler et al. | 364/461 |

FOREIGN PATENT DOCUMENTS

| | | |
|---|---|---|
| A-0 510 613 | 10/1992 | European Pat. Off. . |
| 0 626 589 A1 | 4/1994 | European Pat. Off. . |
| A-0 626 589 | 11/1994 | European Pat. Off. . |
| 35 18 613 A1 | 5/1985 | Germany . |
| 43 17 960 A1 | 5/1993 | Germany . |
| A-4-201641 | 7/1992 | Japan . |
| A-5-203739 | 8/1993 | Japan . |
| A-5-205199 | 8/1993 | Japan . |

*Primary Examiner*—Jeffery Hofsass
*Assistant Examiner*—Julie B. Lieu
*Attorney, Agent, or Firm*—Evenson, McKeown, Edwards & Lenahan, P.L.L.C.

[57] ABSTRACT

In a method for avoiding a collision of a motor vehicle and an obstacle, in which the output signal of a ranging device with several scanning beams emitted in a fan shape toward the front, is received by a receiver and analyzed by an analysis unit connected thereto, the transmitting frequency for scanning beams on the inside of the curve is selected to be higher than for scanning beams on the outside of the curve.

4 Claims, 2 Drawing Sheets

FIG.2 REPETITION TIME IN MS

| CHANNEL | LEFT-HAND CURVE | | RIGHT-HAND CURVE | |
|---|---|---|---|---|
| | R=1000m | R=100m | R=1000m | R=100m |
| 1 | 2 | 1 | 8 | 20 |
| 2 | 2 | 2 | 7 | 20 |
| 3 | 3 | 4 | 6 | 15 |
| 4 | 3 | 5 | 5 | 10 |
| 5 | 4 | 10 | 4 | 10 |
| 6 | 5 | 10 | 3 | 5 |
| 7 | 6 | 15 | 3 | 4 |
| 8 | 7 | 20 | 2 | 2 |
| 9 | 8 | 20 | 2 | 1 |

METHOD AND APPARATUS FOR AVOIDING A COLLISION OF A MOTOR VEHICLE

BACKGROUND AND SUMMARY OF THE INVENTION

This invention relates to a method and apparatus for avoiding a collision of a motor vehicle by means of scanning beams.

A method of this generic type is disclosed in European Patent Document EP 626 589. By means of a steering angle generator, the travelling path of the motor vehicle is calculated, and targets which are situated outside this movement path are not pursued. The movement of the motor vehicle and possible obstacles during this movement are simulated in the motor vehicle.

An object of the present invention is to provide a method of the initially mentioned type which can rapidly detect the occurrence of an obstacle during cornering.

The invention achieves this object by means of a scanning procedure in which a distinction is made between the transmitting frequency of the scanning beams which are directed toward the inside and the outside of a turn. That is, the transmitting frequency is selected as a function of the driving direction.

As described in European Patent Document EP 626 589 A1, the driving direction itself may be determined in a known manner by means of a steering angle generator or by the analysis of different wheel speeds. Other possibilities exist, such as for example, analysis of position and travelling distance information provided by a GPS-receiver in conjunction with a navigation system based on a road map. In all cases, of course, it is necessary that sufficient information exists for calculation of the path of the movement.

By means of the invention, it is possible to select the detection strategy for the receiving channels of the receiver assigned to the scanning beams in a requirement-oriented manner. Thus, during a cornering, the scanning beams which point in the direction of the curve are emitted more frequently than the scanning beams facing away from the curve. This is done because, when an obstacle enters the detection area of the ranging device, entry at a point which is farthest in the direction of the curve has a much higher probability than in the area which is detected by the scanning beams on the outside of the curve. The different transmitting frequency of the scanning beams thus takes into account the probability of the occurrence of an obstacle in the scanning range of the respective scanning beams, and assures its rapid detection by means of the higher scanning frequency.

Corresponding to these probability considerations, the transmitting frequency during a straight-ahead driving of the motor vehicle can be selected to be the same for all scanning beams, since the probability of encountering an obstacle is the same for each scanning beam.

Also, the transmitting frequency of the scanning beams on the inside of the curve may additionally be selected as a function of the curve radius and may be higher in the case of a small curve radius than in the case of a large curve radius. The more similar the cornering is to straight-ahead driving, the less the probability of meeting an obstacle differs for the various scanning beams, and the transmitting frequency of the scanning beams is therefore selected to be correspondingly less different. If, on the other hand, cornering takes place with a very small radius, the probability that the scanning beam innermost in the curve meets an obstacle is particularly high. In the latter case, the transmitting frequency will be raised that much more relative to the case of a straight-ahead driving, and also relative to the transmitting frequency of the other scanning beams. The transmitting frequency of the different scanning beams may change in a uniform manner or in steps with respect to the different scanning beams.

Other objects, advantages and novel features of the present invention will become apparent from the following detailed description of the invention when considered in conjunction with the accompanying drawings.

BRIEF DESCRIPTION OF THE DRAWINGS

FIG. 2 is a table of the different transmitting frequencies for the individual scanning beams as a function of the direction of the curve and of the radius of the curve.

DETAILED DESCRIPTION OF THE DRAWINGS

Figure 1:
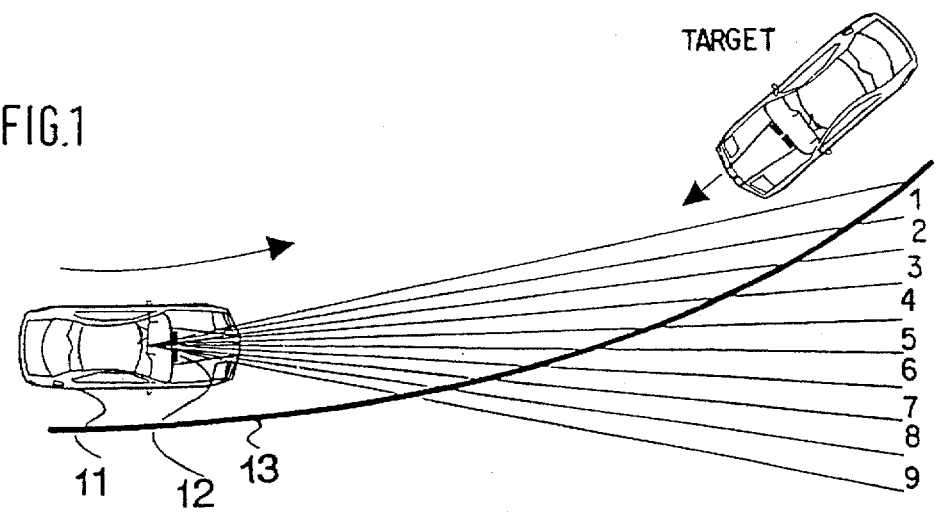
FIG. 1 is a view of the basic construction of a device for implementing the method according to the invention.

The basic construction illustrated in FIG. 1 shows a motor vehicle 11 in which a ranging device emits a number of laser measuring beams (nine are shown) in a fan shaped approximately planar configuration. The laser pulses backscattered by obstacles are received by a receiver which is disposed approximately at the location of the transmitter 12 (not shown). This receiver is assigned to each of the scanning beams and can determine the travelling time and intensity of the reflected signal of each individual scanning beam. This is therefore a 9-channel measuring system which covers the driving corridor without any gaps. The driving corridor is schematically represented by a road boundary 13. In the present case, the motor vehicle moves in a left-hand curve whose right edge is indicated.

The transmitting frequency with which the nine scanning beams are emitted depends on the orientation of the scanning beams relative to the driving corridor or the course of the road, and hence on the probability that each scanning beam will detect an obstacle. This context is explained in FIG. 2 as an example.

FIG. 2 shows a diagram of the transmitting frequencies, that is, the repetition scanning time (here in ms) for the channels 1 to 9 (shown in FIG. 1) in the case of a left-hand curve and a right-hand curve, respectively, as can be seen, the turning radius is also taken into account for the two curve shapes. In this example, turning radii of 1,000 m and of 100 m are assumed. The shown figures mean the following:

Channel 1 will be considered as an example. In the case of a left-hand curve with a radius of 1,000 m, a repetition scanning time of 2 ms is obtained; that is, 500 scanning beams per second are emitted. For channel 9 (the scanning beam on the outside of the curve), in turn, a repetition scanning time of 8 ms is obtained; that is, 125 scanning beams are emitted per second. (In this discussion, the duration of the respective scanning beams is neglected.)

For a smaller curve radius of 100 m, a number of 1,000 scanning beams per second is obtained for channel 1; for channel 9, only 50 scanning beams per second are obtained.

In the case of a right-hand curve, the conditions are mirror-inverted. Channel 1 will now be scanned like channel 9 in the case of the left-hand curve; channel 2 like channel 8, etc.

Because of the lower repetition scanning time during the cornering, targets are detected at a higher probability than in the case of constant repetition times. That is, because the vehicle is undergoing both a translation and a rotation during cornering, the area covered by each scanning beam is constantly changing. Thus, the higher the scanning frequency, the more likely that an obstacle will be detected in timely fashion. This results in the real-time capability of the system; that is, a warning can be triggered earlier or a control can take place earlier with respect to a new target.

Figure 3:
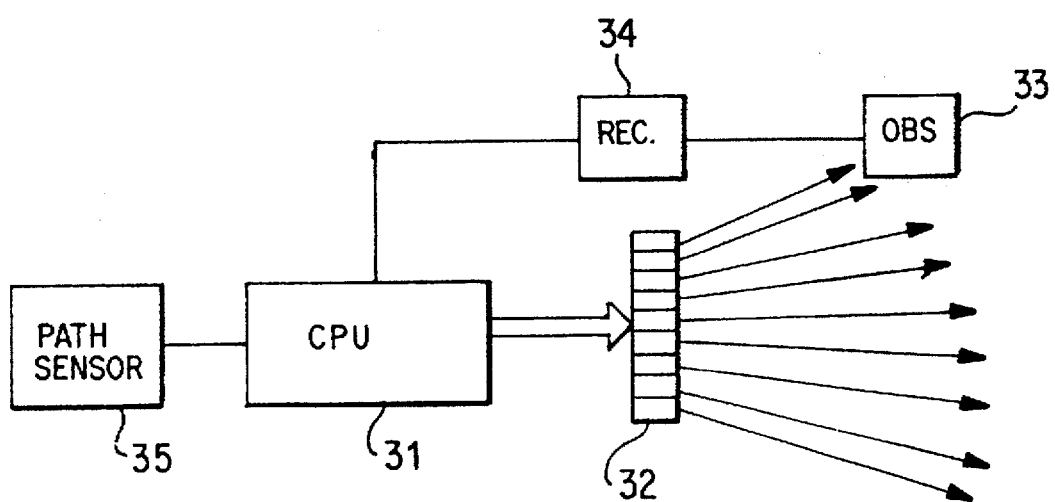
FIG. 3 is a block diagram of a scanning arrangement according to the invention.

FIG. 3 is a block diagram of a scanning arrangement for performing the method according to the invention. A CPU 31 controls the activation of an array of nine illumination sources, such as LED's 32, which illuminate an area that includes a target obstacle 33. Light backscattered from the obstacle is detected by the sensor 34, which may be, for example, a CCD matrix or array. The output from the sensor 34 is provided to the CPU, which analyzes this information in a conventional manner to determine the direction and/or distance to the obstacle. A vehicle path sensor 35 (such as described above) determines whether the vehicle is following a straight path or is turning and provides this information to the CPU 31, which controls the transmitting frequency of the respective LED's as discussed hereinafter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for avoiding a collision of a motor vehicle with an obstacle, by means of a ranging device which emits a plurality of scanning beams in a fan shaped area toward a front of said vehicle, said scanning beams being received by a receiver, with an analysis unit connected to receive its output, said method comprising the steps of:

detecting when said vehicle is turning along curve;

in response to a detection that said vehicle is turning, causing a repetition frequency for transmission of scanning beams directed toward an inside of the curve to be higher than a repetition frequency for scanning beams directed toward an outside of the curve; and receiving and analyzing radiation from said beams which is reflected by an obstacle that enters said fan shaped area.

2. Method according to claim 1 wherein when the motor vehicle is driving straight ahead, the repetition frequency is the same for all scanning beams.

3. Method according to claim 1 wherein the repetition frequency of the scanning beams toward an inside of the curve is higher in the case of a small curve radius than in the case of a large curve radius.

4. Apparatus for detecting an obstacle in a path of a motor vehicle comprising:

a transmitter for emitting a plurality of scanning beams in a fan shaped area toward a front of said vehicle;

a receiver for detecting radiation reflected from said scanning beams by an obstacle within said fan shaped area;

an analysis unit for analyzing an output from said receiver means;

means for detecting when said vehicle is turning along a curved path; and means for controlling a repetition frequency for transmission of scanning beams emitted by said transmitter, including means responsive to a detection that said vehicle is turning, for causing a repetition frequency for scanning beams directed toward an inside of said curved path to be higher than a repetition frequency for scanning beams directed toward an outside of said curved path.

* * * * *